United States Patent Office 3,529,924
Patented Sept. 22, 1970

3,529,924
MODIFIED POLYOLEFIN COPOLYMER COMPOSITION
Daniel Edwin Maloney, Wilmington, Del., assignor to E. I. du Pont de Nemours and Company, Wilmington, Del., a corporation of Delaware
No Drawing. Filed Dec. 31, 1964, Ser. No. 422,498
Int. Cl. D06m 15/38
U.S. Cl. 8—116    4 Claims

ABSTRACT OF THE DISCLOSURE

Proteinaceous or cellulosic substrates coated with a copolymer containing at least 50 mole percent alpha olefin units, and at least 0.1 mole percent of units derived from an alpha, beta ethylenically unsaturated carboxylic acid containing the radical

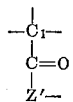

where $C_1$ is a carbon atom in the main copolymer chain, and $Z'$ is derived from a hydroxyl, amine or amide group in the substrate and contains one less hydrogen atom than the group from which it was derived, and processes of preparing coated proteinaceous or cellulose substrates.

---

This invention relates to copolymers containing polymerized alpha-olefin units and polymerized units having pendant anhydride groups, to methods of producing such copolymers, and to composite structures that result from the reaction of the pendant anhydride and other organic groups.

It is known in the art to produce copolymers of alpha-olefins and alpha-beta-ethylenically unsaturated carboxylic acids, such as ethylene-methacrylic acid copolymers. The present invention is concerned with copolymers of this type that have been modified to contain pendant anhydride groups.

Suitable copolymers for use as starting materials for the production of the copolymers of this invention comprise (1) at least one alpha-olefin unit having the general formula

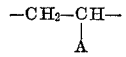

where A is a radical selected from the class consisting of hydrogen and hydrocarbon radicals having one to eight carbon atoms (2) and at least one alpha-beta-ethylenically unsaturated carboxylic acid unit having one to two carboxylic acid groups. Preferably, the alpha-beta-ethylenically unsaturated carboxylic acid unit has 3 to 8 carbon atoms. The concentration of the alpha-olefin unit in the copolymer is at least 50 mol percent and preferably greater than 80 mol percent. The concentration of the alpha-beta-ethylenically unsaturated carboxylic acid unit in the copolymer is 0.2 mol percent to 25 mol percent, preferably from 1 to 10 percent. Specific alpha olefin units useful in the copolymers include: ethylene, propylene, butene-1, styrene, pentene-1, hexene-1, heptene1, 3 methylbutene-1, 4 methylpentene-1, and butadiene. Specific alpha-beta-ethylenically unsaturated carboxylic acid units useful in the copolymers include: acrylic, methacrylic, ethacrylic, itaconic, maleic, fumaric, monoesters of dicarboxylic acid such as ethyl hydrogen fumarate, and maleic anhydride. Maleic anhydride and other mono-alpha-beta-ethylenically unsaturated anhydrides are considered acids for the purposes of the present invention.

The preferred process for preparing the copolymers for use in the process of the present invention is direct copolymerization. This may be achieved by introducing the monomers into a polymerization environment maintained at high pressures, 50 to 3000 atmospheres, and at elevated temperature, 150 to 300° C., together with a free radical polymerization catalyst. An inert solvent such as water or benzene may be employed in the polymerization environment. Random distribution of carboxylic acid groups in all the polymer molecules is best obtained by direct copolymerization. Particular processes for the production of the copolymers are known in the art and described in the literature.

The copolymers may also be obtained by grafting an alpha-beta-ethylenically unsaturated carboxylic acid to a polyolefin base, or by conversion of a copolymer of a polyolefin and a derivative of carboxylic acid to the free acid.

The copolymers are preferably of high molecular weight. Molecular weight is suitably defined by melt index, a measure of viscosity described in detail in ASTM–D–1238–57T. The melt index of the copolymers preferred in the present invention is within the range of 0.1 to 1000 g./10 minutes.

The acid copolymer need not be a two component polymer. Thus, although the olefin content of the copolymer should be at least 50 mol percent, more than one olefin can be employed to provide the hydrocarbon nature of the copolymer, also more than one alpha-beta-ethylenically unsaturated carboxylic acid may be employed. Additionally, any third copolymerizable monomer can be employed in combination with the olefin and the carboxylic acid comonomer. Preferred termonomers are vinyl esters and acrylates, i.e., alkyl acrylates and methacrylates having up to eight carbon atoms, vinyl acetate, vinyl propionate, methyl methacrylate and ethyl acrylate. These termonomers are preferably present to the extent of 0.1 to 25 mol percent based on the total mols polymerized. The scope of base copolymers suitable for use in the present invention is illustrated by the following examples:

Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/methyl methacrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumeric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, ethylene/methacrylic acid/acrylic acid copolymers, ethylene/methacrylic acid/maleic anhydride copolymers, and ethylene/butadiene/methacrylic acid copolymers.

Each of the above copolymers contains a radical having the formula

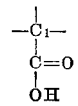

where

is a carbon atom in the main copolymer chain, or in the case of anhydrides a radical that is readily converted to the above radical.

The modified copolymers of this invention may be produced by reacting the copolymer containing alpha-beta-ethylenically unsaturated carboxylic acid units (acid copolymer) with an acyl halide, i.e. a compound having the formula

where R is a hydrocarbon radical having 1 to 22 carbon atoms, R may be saturated or unsaturated, X is a halogen, preferably chlorine, bromine, or iodine, but it may also be fluorine. The reaction between the acyl halide and the copolymer may be illustrated as follows:

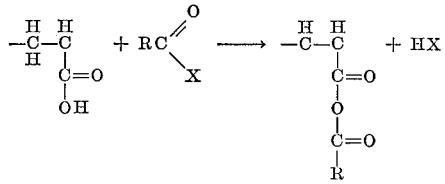

The modified copolymers of this invention may also be produced by reacting the copolymer containing the polymerized units derived from an alpha-beta-ethylenically unsaturated carboxylic acid with a halogenating agent to produce a copolymer containing acyl halide units (such a process is taught in United States application Ser. No. 254,567). This copolymer may then be reacted with an acid salt having the formula

where M is an alkali metal preferably lithium, sodium, or potassium and R is as defined above, to produce the copolymer containing pendant anhydride groups and alkali metal halide. Alternatively, the acyl halide copolymer may be reacted with an acid having the formula

to produce the copolymer containing pendant anhydride groups and hydrohalide acid.

Copolymers containing the alpha-beta-ethylenically unsaturated units may be ion linked with alkali metal ions, such as described in Belgian Pat. 621,846 to Rees, and this product reacted with the acyl halide

to produce the anhydride and an alkali metal halide salt.

Thus, the anhydride copolymers may be produced by reacting a copolymer having units containing the radical

with compounds having the formula

where $C_1$ is a carbon atom in the main polymer chain R is a hydrocarbon radical having 1 to 22 carbon atoms and one of the radicals B and E is halide and the other is selected from the class consisting of —OH and —OM where M is alkali metal.

Still other processes of producing the copolymers of this invention may be obvious to one skilled in the art.

Since it involves the fewest number of steps, the preferred process of producing the anhydride copolymers is to react the acid copolymer with the acyl halide. This process is best carried out by dissolving the acid copolymer in a suitable solvent and then adding the acyl halide compound to the solvent. Suitable solvents include carbon tetrachloride, perchloroethylene, trichloroethylene, benzene, cyclohexane, toluene, and methylene chloride, and mixtures of these solvents. Other solvents are also useful. The solvent is preferably present in an amount such that the copolymer is dissolved, and no advantage is obtained by having the solvent present in great excess of this amount. Heating the solvent-acid copolymer mixture speeds the dissolving process.

The amount of acyl halide that needs to be added to the solution to obtain complete conversion of the acid groups to anhydride groups, is at least stoichiometrically equivalent to the number of acid groups, and preferably, in order to obtain complete conversion rapidly, a large excess (2 to 10 times the stoichiometric amount) of acyl halide is added. Of course, it is not necessary that all the acid groups be converted to anhydride groups in order to obtain a useful product, but it is necessary that at least 0.2 mol percent be concerted to anhydride units. The solution of solvent, copolymer and acyl halide is then preferably mildly heated (about 50° C. to 85° C.) until the conversion. The time of heating will depend on such variables as the concentration of the acyl halide, and the amount of conversion desired, but in general, the heating is continued for 10 minutes to 16 hours.

The anhydride copolymer is then removed from the solvent by evaporation of the solvent, or preferably by precipitation of the polymer by the addition of a non-solvent, such as acetone. The copolymer is preferably then washed with a non-solvent, such as acetone, to remove any impurities, such as unreacted acyl halide or hydrohalogen acid.

The resulting product is stored in a water-free atmosphere to assure that the anhydride links do not become hydrolyzed.

The anhydride copolymers are useful to react with various organic materials to form coatings. Thus, the anhydride copolymer may be applied to organic materials having amine, amide or hydroxyl groups, such as nylon, wool, or cotton. Such coatings decrease the tendency of proteinaceous and cellulosic materials to shrink. The anhydride copolymer is dissolved in a solvent such as those listed above and applied to the organic material. The organic material is then treated to remove the solvent and cause the anhydride to react with the hydrogen of the organic material. The heating is not necessary, but it is desirable to heat to about 90 to 130° C. for about 5 to 20 minutes. The reaction that takes place between the organic material and the anhydride copolymer can be illustrated as follows:

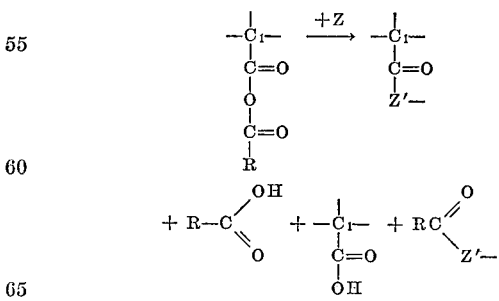

where Z— is an amide group, an amine groups, or a hydroxyl group attached to an organic molecule, and Z' is a Z— group that has reacted and contains one less hydrogen atom than Z—. Z' is bonded to the carbon atoms through an oxygen atom or a nitrogen atom. It can be seen from the above that about ½ of the anhydride groups will be attached to the substrate molecule through —C—Z'— linkages, and about ½ of the anhydride linkages will be converted to acid groups with the

radical becoming attached to the substrate molecule.

In the following examples which illustrate the process of preparing the products of this invention, the properties of the products and uses for the products, all parts and percentages are in parts by weight unless otherwise specified.

EXAMPLE I

Fifty grams of a random copolymer of ethylene-methacrylic acid containing about 5% by weight methacrylic acid was dissolved in 1500 ml. of dry toluene at 65° C. Sixty-one grams of benzoyl chloride was added and the temperature was increased to 65° C. and maintained at this level for 12 hours. The solution was protected from moisture during this period by a drying tube containing calcium sulfate. Anhydride copolymer was precipitated from the solution by adding 5 volumes of dry acetone for every volume of solution. The polymer was separated by filtering and then washed with additional dry acetone, and then dried in a vacuum oven at 60° C. An infra red scan of the polymer showed twin peaks at 5.55 and 5.75$\mu$, three peaks at 9.7, 9.9 and 10.2$\mu$ and absorption at 13.1 and 14.35$\mu$. The infra red scan thus confirmed that the polymer was an anhydride. Conversion appeared to be complete as evidenced by complete disappearance of acid carboxyl peak at 5.9$\mu$.

A portion of this product was then dissolved to form a 0.7% solution (by weight) in perchloroethylene. A 12-inch square of wool flannel was padded with the above solution. The wool was air dried and then cured at 125° C. for 15 minutes. The resulting product was washed according to washing test (AATCC 99–1960T). For purposes of comparison a piece of wool not treated with resin and a piece of wool treated with ethylene-methacrylic acid copolymer identical to that used to prepare the anhydride copolymer, were subjected to the washing test.

The following table illustrates the weight pick-up of each sample.

Resin: Resin pick-up on wt. of fabric, percent
None _____
E/MAA-benzoic anhydride _____ 1.51
E/MAA (95/5) _____ 1.54

Shrinkage of above samples are shown below.

| Resin | Area shrinkage, percent | | | |
|---|---|---|---|---|
| | 1st Wash | 2nd Wash | 3rd Wash | 4th Wash |
| None | 12.6 | 12.5 | 17.3 | 19.4 |
| Mixed anhydride | 5.0 | 5.6 | 7.5 | 7.5 |
| E/MAA | 12.5 | 13.8 | 19.4 | 18.8 |

The above data indicates the ability of the mixed anhydride copolymer to give shrinkage resistance to wool.

EXAMPLE II

Five grams of a random copolymer of ethylene-methacrylic acid containing about 5% by weight methacrylic acid was dissolved in 200 cc. dry toluene at 70° C. Two grams of acetyl chloride was added and the solution heated at 70° C. for ½ hr. The solution was protected from moisture by a drying tube containing calcium sulfate. The polymer was precipitated from solution by addition of about 5 volumes of dry acetone. After filtering and washing the polymer with dry acetone the copolymer was dried. An infra-red scan of a film of the copolymer showed the characteristic twin peaks at 5.55 and 5.75$\mu$, and the single broad peak at 9.9$\mu$ confirming the anhydride structure.

EXAMPLE III

Ten grams of a random ethylene-methacrylic acid copolymer containing about 5% by weight methacrylic acid was dissolved in 300 cc. dry toluene at 65° C. Ten milliliters of propionyl chloride was added and the temperature held at 65° C. for 16 hrs. Polymer was precipitated by the addition of about 5 volumes of dry acetone. Polymer was collected and washed in dry acetone and dried in a vacuum oven. An infrared scan on the polymer film showed the characteristic twin peaks at 5.55$\mu$ and 5.75 and a broad peak at 9.9$\mu$. No evidence of acid carbonyl at 5.9$\mu$ indicated complete conversion to anhydride.

EXAMPLE IV

Twenty grams of a random ethylene-methacrylic acid copolymer containing about 5% by weight methacrylic acid was dissolved in 600 cc. dry toluene at 65° C. Ten grams of stearyl chloride was added and 5 cc. pyridine as acid acceptor and the solution stirred for 16 hrs. The solution was protected from moisture during this period by a drying tube containing calcium sulfate. The copolymer was precipitated by addition of 5 volumes of dry acetone. After filtering, the polymer was collected, washed with dry acetone and dried in a vacuum oven at room temperature. An infrared scan of the polymer film showed the characteristic twin peaks at 5.55 and 5.75$\mu$ and a broad peak at 9.9$\mu$. Conversion was complete with no evidence of acid carboxyl peak at 5.9$\mu$.

EXAMPLE V

Twenty grams of a random copolymer of ethylene-methacrylic acid containing about 5% by weight of methacrylic acid was dissolved in 600 cc. dry toluene at 65° C. Two grams of acetyl bromide dissolved in 25 cc. toluene was added and the solution heated at 65° C. for 16 hrs. The polymer was precipitated from solution by addition of about 5 volumes of dry acetone. After filtering and washing, the polymer was dried. An infrared scan of a film of the copolymer showed the characteristic two peaks at 5.55 and 5.75$\mu$ and the single broad peak at 9.9$\mu$ confirming conversion of the acid group to anhydride.

EXAMPLE VI

Twenty grams of an ethylene-acrylic acid copolymer containing about 2.3% by weight acrylic acid was dissolved in 600 cc. dry toluene at 85° C. Twenty cubic centimeters of propionyl chloride and 5 cc. of pyridine was added and heated at 90° C. for 16 hrs. The polymer was precipitated by addition of about 5 volumes of dry acetone. The polymer was washed with acetone and dried. An infrared scan of a film of the copolymer indicated a sharp peak at 5.55$\mu$, a small peak at 5.72$\mu$ and a broad peak at 9.7$\mu$. No evidence of a carboxyl peak at 5.9$\mu$ confirmed complete conversion of carboxyl group to anhydride.

EXAMPLE VII

Two grams of styrene-methacrylic acid copolymer containing about 5% by weight of methacrylic acid was dissolved in twenty cc. of dry toluene at 65° C. Two cc. of propionyl chloride was added and the solution heated at 65° C. for 3 hrs. The copolymer was then precipitated by addition of 5 volumes of methanol. The copolymer was collected by filtration, washed in methanol and aid dried. An infrared scan on the polymer film showed the disappearance of a large acid carbonyl peak at 5.9$\mu$ and the appearance of a sharp peak at 5.72$\mu$, an increase in a peak at 5.50$\mu$, and a broad peak at 8.3$\mu$. This evidence confirms the formation of a styrene-methacrylic propionic anhydride copolymer.

EXAMPLE VIII

Ten grams of an ethylene-methacrylyl chloride copolymer containing about 10% methacrylyl chloride was dissolved in 300 cc. perchloroethylene at 65° C. To this solution was added 5 grams of sodium benzoate and the slurry heated at 65° C. for 2 hrs. The polymer was precipitated by addition of 5 volumes of dry acetone. The copolymer was washed with dry acetone and collected. An infrared scan of the copolymer film showed two absorption peaks at 5.52 and 5.72μ and a broad peak at 9.9μ confirming the anhydride structure. Absorption at 14.1 and 14.7μ also indicated aromatic structure.

EXAMPLE IX

A thin film of an ethylene-methacrylic acid which contains about 10% methacrylic acid and which has 70% of the methacrylic acid groups neutralized with sodium ion was immersed in propionyl chloride at 50° C. for 15 minutes. The film was then washed in dry acetone to remove propionyl chloride and dried. An infrared scan of the film indicated twin peaks at 5.55 and 5.75μ and a broad peak at 9.8μ characteristic of the anhydride grouping. The absorption due to the carboxylate ion at 6.4μ, which was present in the scan of the original film, was completed eliminated confirming complete conversion of the carboxylate ion to anhydride.

EXAMPLE X

A mixed ethylene-methacrylic/benzoic anhydride copolymer was prepared as described in Example I. A portion of this product was then dissolved to form a 1% solution (by weight) in perchloroethylene. Samples of cotton poplin were padded with the above solution and weighed while wet. The cotton was air dried and then cured at 125° C. for 30 minutes. The following table illustrates the weight pick up of the sample.

| Resin: | Resin pick-up percent on wt. of fabric |
|---|---|
| None | 0 |
| E/MAA | 0.73 |

The samples above were tested for water repellency by the spray test (AATC 22–1952). A rating of 50 was obtained for the anhydride treated sample, and a rating of zero for the sample with no resin treatment. The sample was then extracted in boiling toluene for 2 hrs. and after rinsing and drying still had a rating of 50 thus demonstrating that the copolymer was firmly attached to the cellulose.

I claim:
1. A process which comprises applying a solution of a copolymer containing at least 50 mol percent alpha olefin units of the formula

where A is selected from the class consisting of hydrogen and hydrocarbon radicals of 1 to 8 carbon atoms, and 0.2 to 25 mol percent anhydride units derived from a 3 to 8 carbon atom alpha, beta ethylenically unsaturated carboxylic acid, said anhydride units containing the radical

where $C_1$ is a carbon atom in the main polymer chain and R is a hydrocarbon radical having 1 to 22 carbon atoms to an organic substrate selected from the class consisting of cellulosic and proteinaceous materials, and heating the substrate to a temperature of about 90 to 130° C. for 5 to 20 minutes.

2. The product produced by the process of claim 1.
3. The product of claim 2 in which the organic substrate is wool.
4. The product of claim 2 in which the organic substrate is cellulosic.

References Cited

UNITED STATES PATENTS

| 2,047,398 | 6/1936 | Voss et al. | 8—128.5 |
| 2,396,785 | 3/1946 | Hanford | 260—88.1 XR |
| 2,789,030 | 4/1957 | Fetscher | 8—120 |
| 3,079,294 | 2/1963 | Clarke | 260—88.1 |
| 3,152,920 | 10/1964 | Caldwell et al. | 117—138.8 |

GEORGES F. LESMES, Primary Examiner

J. R. MILLER, Assistant Examiner

U.S. Cl. X.R.

8—115.5, 120, 127.5, 128; 260—8, 17.4, 78.5, 80.7, 80.75, 80.78, 80.8, 82.1, 88.1, 85.7